United States Patent
Morimoto et al.

(10) Patent No.: US 7,030,197 B2
(45) Date of Patent: Apr. 18, 2006

(54) AQUEOUS RESIN COMPOSITION, AQUEOUS COATING MATERIAL CONTAINING THE COMPOSITION, COATING PROVIDED BY THE MATERIAL, AND METAL PLATE COATED WITH THE MATERIAL

(75) Inventors: Osamu Morimoto, Ohtsu (JP); Hideki Tanaka, Ohtsu (JP); Kayoko Takino, Ohtsu (JP); Katsuya Shimeno, Ohtsu (JP); Yasunari Hotta, Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 637 days.

(21) Appl. No.: 10/188,223

(22) Filed: Jul. 3, 2002

(65) Prior Publication Data

US 2003/0083425 A1    May 1, 2003

(30) Foreign Application Priority Data

Jul. 6, 2001  (JP) .............................. 2001-206255
Sep. 4, 2001  (JP) .............................. 2001-267695

(51) Int. Cl.
*C08L 61/10* (2006.01)
*B32B 15/098* (2006.01)

(52) U.S. Cl. .................. 525/429; 525/442; 525/504; 428/458; 524/596

(58) Field of Classification Search ................ 525/429, 525/442, 504; 428/458
See application file for complete search history.

(56) References Cited

U.S. PATENT DOCUMENTS

| | | | |
|---|---|---|---|
| 4,261,873 A * | 4/1981 | Laganis et al. ............. | 524/539 |
| 5,256,757 A | 10/1993 | Kuo | |
| 5,312,891 A | 5/1994 | Kuo | |
| 5,334,652 A | 8/1994 | Wellman et al. | |
| 5,334,671 A | 8/1994 | Yezrielev et al. | |
| 6,369,133 B1 | 4/2002 | Kitabatake | |

FOREIGN PATENT DOCUMENTS

| | | |
|---|---|---|
| DE | 4010167 A1 * | 10/1991 |
| EP | 0 419 088 A1 | 3/1991 |
| EP | 0 794 212 A | 9/1997 |
| JP | 09-296100 A | 11/1997 |
| JP | 11-061035 A | 3/1999 |
| JP | 11-124542 A | 5/1999 |
| JP | 11-236529 A | 8/1999 |
| JP | 11-315251 A | 11/1999 |
| JP | 11 315251 A | 11/1999 |
| JP | 2000-026709 A | 1/2000 |
| WO | WO 98 12272 A | 3/1998 |
| WO | WO 99 51430 A | 10/1999 |

* cited by examiner

*Primary Examiner*—Tae H. Yoon
(74) *Attorney, Agent, or Firm*—Kenyon & Kenyon LLP

(57) ABSTRACT

There is provided an aqueous resin composition excellent in settability, flexibility, retort resistance, hygienicity, sprayability and dispersibility in water, and used to coat an internal surface of a can. The aqueous resin composition contains: polyester resin having a specific structure in a molecular chain thereof and/or at a terminal of the molecular chain, the polyester resin having added thereto an opened ring of a compound having a molecule with a carboxylic anhydride group therein, at least no less than 10% by mole of the compound being a compound having a molecule with no less than two carboxylic anhydride groups, the polyester resin having a resin acid value of 150 to 800 eq/$10^6$ g and a number-average molecular weight of 5,000 to 100,000; resol-type phenol resin corresponding to a copolymer of a formaldehyde and a phenol compound containing no less than 50% by weight of a phenol compound having no less than three reactive point with formaldehyde, the resol-type phenol resin having no less than one alkoxy methyl group on average per aromatic nucleus; a basic compound; and water, or water and an organic solvent.

11 Claims, No Drawings

AQUEOUS RESIN COMPOSITION, AQUEOUS COATING MATERIAL CONTAINING THE COMPOSITION, COATING PROVIDED BY THE MATERIAL, AND METAL PLATE COATED WITH THE MATERIAL

FIELD OF THE INVENTION

The present invention relates to aqueous resin compositions excellent as a coating material applied on internal surfaces of cans. The present invention also relates to coating materials containing the aqueous resin composition, and coatings provided thereby. Furthermore the present invention relates to metal plates coated with the coating material.

Furthermore the present invention relates to aqueous resin compositions containing polyester resin and phenol resin to be excellent in settability, flexibility, retort resistance, and extractability (hygienicity), particularly suitable for a can coating material, and to metal plates coated with the aqueous resin composition. The polyester resin has the following structural formula:

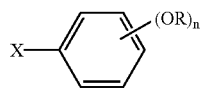

(1)

wherein R: H, alkyl or an aryl group,
X: an organic segment having at least one hydroxyl group or carboxyl group (including a carboxylic anhydride), and
n: 1 to 3 and the polyester resin is capable of dispersion in water when a carboxyl group in a molecular chain thereof is neutralized with a basic compound.

DESCRIPTION OF RELATED ART

Coating materials applied on internal surfaces of food and beverage cans are required not to be toxic or provide pollutant effluents when they are dumped or recycled, and they are also required to endure processings of cans being produced, vapor generated in retort processes, heat, salt in contents, and acid.

Conventionally, coating materials mainly provided by epoxy resin have often been used to coat internal surfaces of cans. In particular, a disperse-in-water-type (or aqueous) epoxy-acrylic coating material has increasingly substituted for solution-based coating materials and used as a material for coating internal surfaces of cans to protect natural environments and improve working environments. Epoxy-acrylic resin can maintain uniform dispersibility in water and the resin that is applied on a can's internal surface provides excellent flexibility, excellent retort resistance, and the like. It has conventionally also been regarded as excellent in hygienicity for human body.

The epoxy-acrylic coating material, however, contains bisphenol-A as a source material, which has been pointed out as a possible extrinsic-factor endocrine disruptor, and in recent years in the field of foods in particular there is an increased demand to avoid using bisphenol-A for coating materials applied on internal surfaces of cans. Thus there is a demand for developing an aqueous coating material substituting for bisphenol-A. However, there is still not obtained a sufficiently suitable composition for the coating material.

For example, as described in Japanese Patent Laying-Open Nos. 9-296100, 11-61035, 11-124542, 11-236529, and 2000-26709, it is desirable that dicarboxylic acid, glycol, polycarboxylic monoanhydride or the like be used to depolymerize polyester resin or open a ring of the former and add it to the latter to obtain a terminal of the resin with carboxyl groups. Furthermore, it has also been proposed that the medium product is dispersed in water by neutralizing a carboxyl group in a molecule of the medium product to provide an aqueous coating resin composition containing amino resin and protective colloid.

Although these coating materials are excellent in settability and flexibility, amino resin is less hygienic and melamine formaldehyde resin in particular has poor retort resistance. It is possible to improve the poor retort resistance by using hydrophobic amino resin such as benzoguanamine-formaldehyde resin. However, the polyester resins obtained by the methods disclosed in the above publications have a carboxyl group concentrated at a terminal of a molecule thereof, resulting in poor disposition stability. Accordingly, protective colloid needs to be used to provide the coating material with stability. The protective colloid, however, impairs retort resistance and hygienicity. Furthermore, with its poor disposition stability, the coating material that is sprayed to coat a can's internal surface is disadvantageously stuck in the spray's nozzle or drips after it is applied.

Japanese Patent Laying-Open No. 11-315251 proposes combining polyester resin and resol-type phenol resin to provide a coating material improved in settability, flexibility, retort resistance, and hygienicity. However, the resol-type phenol resin described in the publication is, although partially, alkyl-etherified and thus exhibits poor dispersibility in water. To disperse the resin in water and maintain its dispersibility, protective colloid, a surfactant or the like is still required, which results in reduced retort resistance. The phenol resin disclosed in the publication can be used to achieve a higher level of settability with polyester resin than conventional phenol resin, although the higher settability is still lower than settability of a coating material formed of a combination of amino resin and polyester resin or that of phenol resin and epoxy resin and it can thus result in insufficient retort resistance. The publication also does not disclose any method or example specifically describing using these as an aqueous coating material.

SUMMARY OF THE INVENTION

To overcome the above disadvantages the present invention provides an aqueous resin composition for application on an internal surface of a can, free of bisphenol-A or any other similar endocrine disrupters and excellent in settability, flexibility, retort resistance, hygienicity, sprayability, and dispersibility in water.

The present inventors have noted that the above object can be achieved by providing polyester resin having excellent dispersibility in water with settability, flexibility, retort resistance, hygienicity and sprayability, and the present inventors have found that by opening a ring of a carboxylic polyanhydride and adding it to polyester resin to introduce a reaction, by providing a pendant-like carboxyl group modification intermediate a molecular chain thereof, and by further neutralizing it with a basic compound to allow it to be aqueous (or have dispersibility in water), even a mixed hydrophobic resin such as phenol resin can also exhibit uniform dispersibility maintained in water.

Furthermore, using aqueous polyester resin that is not used in the above conventional art, the present inventors have studied to satisfactorily provide settability, flexibility, retort resistance and hygienicity in issues associated with the aqueous resin composition for application on a can's internal surface. As a result, it has been found that polyester resin having a molecular chain with the following structural formula:

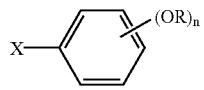

(1)

wherein R: H, alkyl or an aryl group,
X: an organic segment having at least one hydroxyl group or carboxyl group (including a carboxylic anhydride), and
n: 1 to 3 introduced therein and modified with a carboxyl group allows hydrophobic resin, phenol resin in particular, to exhibit uniform dispersibility maintained in water, and furthermore settability with the phenol resin to be significantly enhanced, resolving the above disadvantages and thus arriving at the present invention.

More specifically, the present invention provides an aqueous resin composition containing components:

(A) polyester resin obtained by opening a ring of a compound having a molecule with a carboxylic anhydride group therein and adding the opened ring of the compound to introduce a reaction, the compound containing no less than 10% by mole of a carboxylic polyanhydride, the polyester resin having a resin acid value of 150 to 800 eq/$10^6$ g and a number-average molecular weight of 5,000–100,000;

(B) phenol resin;

(C) a basic compound; and (D) water, or water and an organic solvent.

Preferably the phenol resin is resol-type phenol resin. Desirably the phenol resin corresponds to a copolymer of a phenol compound and formaldehyde, the phenol compound containing less than 50% by weight of a phenol compound having no less than three reactive sites with formaldehyde.

Furthermore the phenol resin preferably has one or more alkoxy methyl groups on average per aromatic nucleus.

Preferably the aqueous resin composition contains 1 to 99 parts by weight of the phenol resin for 99 parts by weight of the polyester resin. Desirably the aqueous resin composition contains the basic compound equivalent weight of 0.5 to 1.5 for the resin acid value of the polyester resin. Furthermore the aqueous resin composition preferably contains 0.01 to 3 parts by weight of an acid catalyst for 100 parts by weight of the polyester resin and the phenol resin that are added together. Furthermore the compound having a molecule with no less than two carboxylic anhydride groups is desirably an ethyleneglycolbistrimellitate dianhydride.

Furthermore the polyester resin preferably has a glass transition temperature (Tg) falling within a range of 0 to 120° C. Furthermore the phenol resin is desirably gelated in no less than 30 seconds.

Furthermore the present invention also includes an aqueous coating material containing the aforementioned aqueous resin composition. The present invention also includes a coating provided by the aqueous coating material. Furthermore the present invention also includes a metal plate and can coated thereby.

Furthermore the present invention also provides an aqueous coating resin composition and a metal plate coated thereby, characterized in that the composition has components: (2A) polyester resin having the following structural formula:

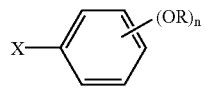

(1)

wherein R: H, alkyl or an aryl group,
X: an organic segment having at least one hydroxyl group or carboxyl group (including a carboxylic anhydride), and
n: 1 to 3 in a molecular chain thereof and/or at a terminal of the molecular chain, and a carboxyl group in the molecular chain, and having a resin acid value of 150 to 800 eq/$10^6$ g and a number-average molecular weight of 5,000 to 100,000; and (2B) phenol resin corresponding to a crosslinker that are dispersed in water or water/an organic solvent in the presence of a basic compound and thus contained.

The foregoing and other objects, features, aspects and advantages of the present invention will become more apparent from the following detailed description of the present invention.

DESCRIPTION OF THE PREFERRED EMBODIMENTS

Hereinafter the present invention in a first embodiment will be presented to more specifically describe the same.

The present invention provides an aqueous resin composition containing components: (A) a specific polyester resin; (B) a specific phenol resin; (C) a basic compound; and (D) water, or water and an organic solvent.

The polyester resin used in the present invention is polyester resin having added thereto an opened ring of a compound having a molecule with a carboxylic anhydride group therein, the compound at least containing no less than 10% by mole of a carboxylic polyanhydride, and the polyester resin has a resin acid value of 150 to 800 eq/$10^6$ g and a number-average molecular weight of 5,000 to 100,000.

Herein in the present invention the carboxylic polyanhydride corresponds to a compound having a molecule with no less than two carboxylic anhydride groups therein. Furthermore, a carboxylic monoanhydride will refer to a compound having a molecule with a single carboxylic anhydride group therein.

Furthermore, polyester resin generally refers to polymers having a polymer chain containing an ester linkage. Typically it is often synthesized by polycondensation of polyvalent carboxylic acid and polyalcohol.

The polyester used in the present invention will initially be described.

The polyester resin contains a carboxylic acid component such as: terephthalic acid, isophthalic acid, ortho-phthalic acid, naphthalene dicarboxylic acid and other similar aromatic dicarboxylic acids; succinic acid, glutaric acid, adipic acid, azelaic acid, sebacic acid, dodecanedione acid, dimer acid and other similar aliphatic dicarboxylic acids; maleic acid (anhydrous), fumaric acid, maleic acid added terpene and other similar unsaturated dicarboxylic acids; 1, 4-cyclohexane dicarboxylic acid, tetrahydrophthalic acid, hexahydroisophthalic acid, 1, 2-cyclohexenedicarboxylic acid and other similar alicyclic dicarboxylic acids; trimellitic acid (anhydrous), pyromellitic acid (anhydrous), methylcyclohexenetricarboxylic acid and other similar carboxylic acids of a valence of three or more; and 4, 4-bis (4'-hydroxy phenyl)-pentanoic acid, 4-mono (4'-hydroxy phenyl)-pentanoic acid, p-hydroxybenzoic acid and other similar monocarboxylic acids, and it can contain one or more selected from these components.

Furthermore the polyester resin contains a polyalcohol component such as: ethylene glycol, propylene glycol (1, 2-propanediol), 1, 3-propanediol, 1, 4-butanediol, 1, 2-butanediol, 1, 3-butanediol, 2-methyl-1, 3-propanediol, neopentylglycol, 1, 5-pentanediol, 1, 6-hexanediol, 3-methyl-1, 5-pentanediol, 2-ethyl-2-butyl-1, 3-propanediol, 2, 4-diethyl-1, 5-pentanediol, 1-methyl-1, 8-octanediol, 3-methyl-1, 6-hexanediol, 4-methyl-1, 7-heptanediol, 4-methyl-1, 8-octanediol, 4-propyl-1, 8-octanediol, 1, 9-nonanediol and other similar aliphatic glycols; diethylene glycol, triethylene glycol, polyethylene glycol, polypropylene glycol, polytetramethylene glycol and other similar ether glycols; 1, 4-cyclohexanedimethanol, 1, 3-cyclohexanedimethanol, 1, 2-cyclohexanedimethanol, tricyclodecaneglycols, hydrogenated bisphenols and other similar alicyclic polyalcohols; trimethylolpropane, trimethylolethane, pentaerythritol and other similar polyalchols having a valence of three or more, and it can contain one or more selected from these components.

The polyester resin is polyester resin having added thereto an opened ring of a compound having a molecule with a carboxylic anhydride group therein and the compound at least contains no less than 10% by mole of a carboxylic polyanhydride.

In the compound the carboxylic polyanhydride has a ring opened and thus added to polyester resin to allow the polyester resin to have a molecular chain with a divalent carboxyl group therein in a pendant-like structure, as exemplarily shown in an expression (2):

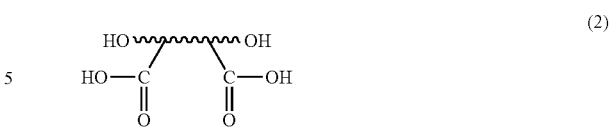

As compared to polyester resin provided with an acid value for example by a carboxylic monoanhydride, the polyester resin having the pendant structure with the divalent carboxyl group can facilitate dispersion in water for low acid values, reduce a dispersoid's particle size, and enhance the dispersoid's stability to enhance re-solubility, sprayability, retort resistance and other properties.

If a carboxylic monohydride alone is used to provide an acid value, some polyester resins would be reduced in molecular weight through acidolysis and can thus provide reduced flexibility. If a carboxylic polyanhydride is used, then, as shown in an expression (3), polyester's molecular chain is extended to provide a larger molecular weight and thus tend to provide enhanced flexibility.

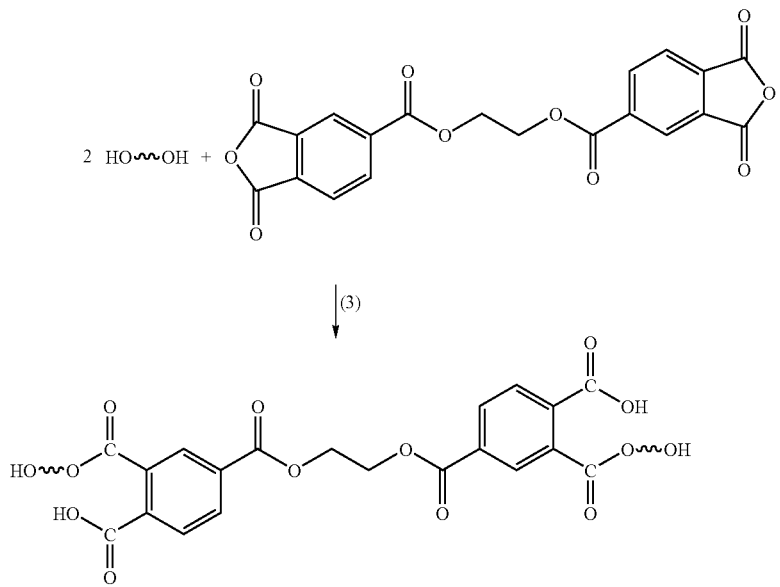

The compound having a carboxylic anhydride group in a molecule thereof having a ring opened and added to the polyester resin, needs to contain no less than 10% by mole of a carboxylic polyanhydride. If the compound contains less than 10% by mole of the carboxylic polyanhydride, the polyester resin can hardly effectively disperse in water or have the polyester's molecular chain increased in molecular weight. The compound having a molecule with a carboxylic anhydride group therein preferably contains no less than 20% by mole, more preferably no less than 30% by mole of a carboxylic polyanhydride.

The carboxylic polyanhydride can for example include pyromellitic anhydride, 1, 2, 3, 4-butanetetracarboxylic dianhydride, 1, 2, 3, 4-pentanetetracarboxylic dianhydride, 3, 3', 4, 4'-benzophenonetetracarboxylic dianhydride, cyclopentanetetracarboxylic dianhydride, 2, 3, 6, 7-naphthalenetetracarboxylic dianhydride, 1, 2, 5, 6-naphthalenetetracarboxylic dianhydride, ethyleneglycolbistrimellitate dianhydride, 2, 2', 3, 3'-diphenyltetracarboxylic dianhydride, thiophene-2, 3, 4, 5-tetracarboxylic dianhydride, ethylenetetracarboxylic dianhydride, 4, 4'-oxydiphthalic dianhydride, and 5-(2,5-dioxotetrahydro-3-furanyl)-3-methyl-3-cyclohexene -1,2-dicarboxylic anhydride. Of these carboxylic polyanhydrides, ethyleneglycolbistrimellitate dianhydride can be used most suitably.

The compound having a carboxylic anhydride group in a molecule thereof having a ring to open and add to the polyester resin, contains a carboxylic monoanhydride such as phthalic anhydride, maleic anhydride, succinic anhydride, trimellitic anhydride, itaconic anhydride, citraconic anhydride, 5-(2, 5-dioxotetrahydrofurfuryl)-3-cyclohexene-1, 2-dicarboxylic anhydride and other similar monoanhydrides, hexahydrophthalic anhydride, and tetrahydrophthalic anhydride, and it can be one or more selected from the above.

Adding a compound having a molecule with a carboxylic anhydride group therein to obtain polyester resin for use in the present invention is not limited to any specific method and it can be a well known method. More specifically, immediately after polyester resin that has not yet had added thereto a compound having a molecule with a carboxylic anhydride group therein attains a targeted molecular weight (n equal to 5,000 to 100,000), a required amount of the compound that is melt (150 to 280° C.) may be added to the polyester resin. Alternatively, when polyester resin that does not have added thereto a compound having a molecule with a carboxylic anhydride group therein has less than a targeted molecular weight (Mn smaller than 5,000), the compound may be added to the polyester resin to increase the current molecular weight to the target in an ambient of nitrogen. Alternatively, polyester resin that has not yet had added thereto a compound having a molecule with a carboxylic anhydride group therein and the compound may be mixed and kneaded by a fusion and extrusion apparatus to add the compound to the polyester resin. Any of these methods can provide polyester resin used in the present invention.

The polyester resin used in the present invention needs to have a resin acid value of 150 to 800 $eq/10^6$ g. The resin acid value is a numerical value obtained after a reaction provided by adding an opened ring of the compound having the carboxylic anhydride group.

If the polyester resin has a resin acid value of less than 150 $eq/10^6$ g the polyester resin exhibits poor dispersibility in water, which results in unstable storage of a dispersion. If the polyester resin has a resin acid value exceeding 800 eq/10g, the coating of the present invention would have reduced retort resistance. The aqueous resin composition of the present invention preferably has a resin acid value in a range of 180 to 500 $eq/10^6$ g, more preferably 200 to 400 $eq/10^6$ g.

The polyester resin used in the present invention needs to have a number-average molecular weight in a range of 5,000 to 100,000. For number-average molecular weights of less than 5,000, the coating of the present invention would be brittle and thus poor in flexibility and retort resistance. For number-average molecular weights exceeding 100,000, applicability would be reduced. The polyester resin preferably has a number-average molecular weight in a range of 8,000 to 50,000, more preferably 10,000 to 30,000. Note that the number-average molecular weight referred to herein is measured by means of gel permeation chromatography (GPC) through a calibration curve of standard polystyrene.

Furthermore, the polyester resin used in the present invention preferably has a glass transition temperature (Tg) in a range of 0 to 120° C., more preferably 10 to 100° C., and most preferably 30 to 100° C. For a glass transition temperature less than 0° C., the coating of the present invention tends to have inferior retort resistance. A glass transition temperature of no less than 50° C. is desirable, in particular, if the coating of the present invention is applied on a can accommodating a content requiring to keep flavor. For a glass transition temperature exceeding 120° C., the coating of the present invention can provide poor flexibility and the aqueous resin composition of the present invention can have poor applicability. Note that the glass transition temperature (Tg) referred to herein is measured by a differential scanning calorimeter (DSC).

The phenol resin used in the present invention is preferably resol-type phenol resin. The resol-type phenol resin serves as a crosslinker in the aqueous resin composition of the present invention. Herein, resol-type phenol resin generally refers to phenol resin synthesized by addition and condensation of phenols and formaldehyde via a basic catalyst. In general, resol-type phenol resin is thermosetting resin which autosets when it is heated.

The resol-type phenol resin used in the present invention is more preferably a copolymer of a phenol compound containing no less than 50% by weight of a phenol compound having no less than three functional groups and formaldehyde, and it has at least one alkoxy methyl group on average per aromatic nucleus.

A source material of the resol-type phenol resin used in the present invention preferably contains no less than 50% by weight of a phenol compound having no less than three functional groups. Herein the phenol compound having no less than three functional groups refers to a phenol compound having no less than three sites significantly reactive with formaldehyde.

If the source material contains less than 50% by weight of the phenol compound having no less than three functional groups, the polyester resin used in the present invention can be reduced in settability. Preferably the source material contains no less than 70% by weight of the phenol compound having no less than three functional groups.

The phenol compound having no less than three functional groups can for example be phenol, m-cresol, m-ethylphenol, 3, 5-xylenol, m-methoxy phenol, bisphenol-A and bisphenol-F, and it can be one or more thereof mixed together.

In addition to the trifunctional phenol compound, the source material may have less than 50% by weight of a phenol compound such as o-cresol, p-cresol, p-tert-butylphenol, p-ethylphenol, 2, 3-xylenol, 2, 5-xylenol, or other similar difunctional phenol compounds added thereto without impaired performance.

The resol-phenol resin used in the present invention preferably has at least one alkoxy methyl group on average per aromatic nucleus.

If the resol-type phenol resin has less than one alkoxy methyl group on average per aromatic nucleus, settability with polyester used in the present invention can be reduced and the coating of the present invention can be poor in retort resistance and flexibility. Furthermore if the resol-type phenol resin used in the present invention is not provided with an alkoxy group and maintains a methylol group, it may have poor settability with the polyester resin of the present invention.

The resol-type phenol resin used in the present invention is obtained from resol-type phenol resin containing no less than 50% by weight of a phenol compound having no less than three reactive sites with formaldehyde that is provided with a methylol group by formalin, paraformaldehyde, trioxane or the like and further has the methylol group provided with an alkoxy group.

The resol-type phenol resin containing no less than 50% by weight of a phenol compound having no less than three reactive sites with formaldehyde is provided with an alkoxy group by alcohol having a valence of one with one to eight carbon atoms. The monovalent alcohol preferably has one to four carbon atoms. Furthermore, the monovalent alcohol can for example be methanol, ethanol, n-propanol, n-butanol, isobutanol or the like. Of the monovalent alcohols listed here, n-butanol is most preferable. Furthermore, the resol-type phenol resin containing no less than 50% by weight of a phenol compound having no less than three reactive sites with formaldehyde may be provided with an alkoxy group by using phosphoric acid or any other similar catalyst.

The resol-type phenol resin having at least one alkoxy methyl group on average per aromatic nucleus can be obtained by adjusting a proportion of a source material used in a polymerization reaction performed in a process for producing resol-type phenol resin and a condition for the reaction.

Preferably, the resol-type phenol resin used in the present invention after it is dropped on a metal plate heated to 150° C. requires no less than 30 seconds before it is gelated or no longer insoluble in methylethylketone (hereinafter this period of time will be referred to as a "gel time"). For a gel time of less than 30 seconds, the resol-type phenol resin's mutual self-condensation reaction is accelerated. Its setting with the polyester resin and its crosslinking reaction are thus decelerated, tending to contribute to reduced settability and a coating cloudy due to decreasing compatibility. A gel time of no less than 100 seconds is more preferable and that of no less than 150 seconds is most preferable.

The resol-type phenol resin can have a gel time of no less than 30 seconds depending on adjusting the chemical structure, molecular weight and the like of a chemical compound used as a source material for polymerization in its production process.

The aqueous resin composition of the present invention preferably contains 1 to 99 parts by weight of the present phenol resin for 99 parts by weight of the present polyester resin. For less than one part by weight of the phenol resin, the coating of the present invention tends to be reduced in settability and water resistance and it can also be insufficient in flexibility and retort resistance. For more than 99 parts by weight of the resol-type phenol resin, the coating tends to be less flexible and can also provide insufficient flexibility.

Together with the phenol resin used in the present invention, another crosslinker can additionally be used, as required. Another crosslinker can for example be amino resin, an isocyanate compound, epoxy resin or the like. Hygienically, amino resin is particularly preferable. These crosslinkers can be blended to a degree which does not impair the performance of the coating of the present invention.

The aforementioned amino resin can include amino resin having a methylol group that is obtained by a reaction between melamine, urea, benzoguanamine, acetoguanamine, steroguanamine, spiloguanamine, dicyandiamide or any other similar amino component, and formaldehyde, paraformaldehyde, acetaldehyde, benzaldehyde or any other similar aldehyde component. The amino resin also includes that having the methylol group that is etherified with alcohol having one to six carbon atoms. These amino resins can be used individually or together. Of these amino resins, those using melamine and benzoguanamine are hygienically particularly preferable. Among these amino resins, that using benzoguanamine is most preferable as it is excellent in retort resistance and extractability.

The amino resin using benzoguanamine is preferably benzoguanamine resin methyl-etherified or having a methylol group partially or entirely etherified with methyl alcohol, benzoguanamine resin butyl-etherified or having a methylol group etherified with butyl alcohol, or benzoguanamine resin etherified by a mixture of methyl ether and butyl ether provided by etherification using methyl alcohol and butyl alcohol, respectively. The butyl alcohol is particularly preferably isobutyl alcohol or n-butyl alcohol.

The amino resin using melamine is preferably melamine resin methyl-etherified or having a methylol group partially or entirely etherified with methyl alcohol, melamine resin butyl-etherified or having a methylol group partially or entirely etherified with butyl alcohol, or melamine resin etherified by a mixture of methyl ether and butyl ether provided by etherification using methyl alcohol and butyl alcohol, respectively.

The aqueous resin composition of the present invention preferably contains 0.01 to 3 parts by weight of an acid catalyst as a setting catalyst for 100 parts by weight of the entire resin (the polyester resin and the phenol resin added together). With the aqueous resin composition containing the acid catalyst, a crosslinking reaction can be facilitated and a steadily crosslink can be obtained at a low temperature in a reduced period of time. For less than 0.01 part by weight of the acid catalyst, setting tends to be less facilitated. For more than 3 parts by weight of the acid catalyst, the coating would be reduced in water resistance and retort resistance.

The aforementioned acid catalyst can for example be sulfuric acid, p-toluenesulfonic acid, dodecylbenzenesulfonic acid, naphthalene sulfonic acid, dinonylnaphthalenesulfonic acid, dinonylnaphthalenedisulfonic acid, camphor sulfonic acid, phosphoric acid and these acids with an amine block (i.e., having amine added thereto to partially neutralize the acid), and it can be one or more thereof used together. Of these acid catalysts, dodecylbenzenesulfonic acid and dodecylbenzenesulfonic acid with the amine block are particularly preferable in terms of compatibility with resin and hygiene.

The aqueous resin composition of the present invention can contain a lubricant, as required. Preferably, 0.1 to 10 parts by weight of the lubricant is added to 100 parts by weight of the entire resin (the polyester resin and the phenol resin added together). Introducing the lubricant can prevent a coating from having a scar in producing a can and help the coating to be smoother in shaping it. It is particularly effective in DI processing and DRD processing.

The aqueous resin composition of the present invention can have a lubricant added thereto, such as a polyol compound and a fatty acid that are esterified or fatty acid ester wax, silicon-based wax, fluorine-based wax, polyethylene or any other similar polyolefine wax, lanolin-based wax, montan wax, microcrystalline wax, carnouba wax, and a silicon-based compound. One or more of these lubricants mixed together can be used.

For applications, the aqueous resin composition of the present invention can be blended with titanium oxide, silica or any other similar known inorganic pigment, phosphoric acid and an esterification thereof, an organic tin compound or any other similar setting catalyst, surfactant, defoamer, dispersant, lubricant or other similar known additives.

The aqueous resin composition of the present invention contains the aforementioned polyester resin, the aforementioned phenol resin, a basic compound, and water/water and an organic solvent.

The basic compound used in the present invention is preferably a compound vaporizable by baking provided when a coating is formed, i.e., ammonium and/or an organic amine compound having a boiling point of no more than 250 degrees centigrade. More specifically the basic compound can for example be triethylamine, N, N-diethylethanolamine, N, N-dimethylethanolamine, aminoethanolamine, N-methyl-N, N-diethanolamine, isopropylamine, iminobispropylamine, ethylamine, diethylamine, 3-ethoxypropylamine, 3-diethylaminopropylamine, sec-butylamine, propylamine, methylaminopropylamine, dimethylaminopropylamine, methyliminobispropylamine, 3-methoxypropylamine, monoethanolamine, diethanolamine, tliethanolamine, morpholine, N-methylmorpholine and N-ethylmorpholine. These basic compounds are required to have an amount capable of at least partially neutralizing carboxyl groups of the polyester resin. More specifically, the basic compound equivalent weight of 0.5 to 1.5 is desirably added to the acid value of the polyester resin. The basic compound equivalent weight of less than 0.5 can result in the aqueous resin composition of the present invention dispersing in water less effectively. The basic compound equivalent weight of more than 1.5 can result in significantly increased viscosity of the aqueous resin composition of the present invention and hydrolysis of the polyester resin used in the present invention.

The aqueous resin composition of the present invention contains a specific polyester resin, a specific phenol resin, a basic compound, and water/water and an organic solvent.

Although the aqueous resin composition of the present invention that is dispersed in water free of an organic solvent can preferably used, to maintain film formability, the coating's dryability, re-solubility and stable dispersibility the aqueous resin composition of the present invention that is dispersed in water containing an organic solvent can more preferably be used.

The organic solvent is preferably those providing polyester with plasticity effectively and also amphipatic, such as ethanol, n-propanol, isopropanol, n-butanol, isobutanol, sec-butanol, tert-butanol, isoamyl alcohol, sec-amyl alcohol, tert-amyl alcohol, n-hexanol, cyclohexanol and other similar alcohols, methylethylketone, methylisobutylketone, ethylbutylketone, and other similar ketones, tetrahydrofuran, dioxane, 1, 3-dioxolane and other similar cyclic ethers, ethyleneglycol, ethyleneglycolmonomethylether, ethyleneglycolmonoethylether, ethylene glycolmonobutylether, ethyleneglycolmonoethylether acetate, diethyleneglycol, diethyleneglycolmonomethylether, diethyleneglycolmonoethylether, diethyleneglycolmonobutylether, diethyleneglycolethylether acetate, propylene glycol, propyleneglycolmonomethylether, propyleneglycolmonobutylether, propyleneglycolmethylether acetate and other similar glycol derivatives, 3-methoxy-3-methyl butanol, 3-methoxybutanol, acetonitrile, dimethylformamide, dimethylacetamide, diacetone alcohol, ethyl acetoacetate, and the like.

The aqueous resin composition of the present invention can be obtained in known methods. For example, one or more of the aforementioned organic solvents is/are selected and the polyester resin used in the present invention is heated and thus dissolved. Then the resol-type phenol resin used in the present invention and a basic compound are agitated and added by a required amount and water is then added to obtain the aqueous resin composition of the present invention.

In this method, the water to be added may be heated to have a temperature close to that of the organic solvent having the polyester resin dissolved therein. The addition of the water allows phase transition from W/O-type emulsion to O/W-type emulsion.

Furthermore, thereafter, as required, the organic solvent used to dissolve the polyester resin can be heated or its surrounding ambient can be vacuumed so that the solvent can be removed through vaporization. Desirably, the ambient is vacuumed at no more than 100° C., more preferably no more than 80° C., and the solvent is thus removed through vaporization to allow the resol-type phenol resin to reduce condensation attributed to the heat introduced during the removal of the organic solvent through vaporization. If the organic solvent is entirely removed a completely aqueous resin composition can be obtained. To allow a dispersoid to be stable and to provide film formability, however, the organic solvent of 3 to 20% is desirably contained.

Furthermore the polyester resin used in the present invention can be crushed into pieces and the resol-type phenol resin used in the present invention, a basic compound and the aforementioned organic solvent can be introduced by a required amount and heated and thus dispersed to obtain the aqueous resin composition of the present invention. Desirably, they are heated at no more than 100° C.

A more stable aqueous dispersion can be obtained, however, by selecting one or more of the above organic solvents, heating and thus dissolving the polyester resin used in the present invention, then agitating and thus adding the resol-type phenol resin used in the present invention and a basic compound by a required amount, and then adding water to disperse the medium.

The aqueous resin composition of the present invention can be used as a vehicle for example of coating materials, ink, coating agents and adhesives, or an agent for processing fiber, film and paper products, and it can form a coating having excellent flexibility. While the aqueous resin composition of the present invention can be used as it is, it can be blended with the aforementioned crosslinker or setting catalyst and then baked and thus set to obtain a high level of water resistance. Furthermore the aqueous resin composition of the present invention can be blended for example with pigments, dye and various types of additives. Furthermore the aqueous resin composition of the present invention that is mixed with another aqueous resin and an aqueous dispersion can provide increased coating properties.

The aqueous coating material of the present invention can have resin added thereto to improve the coating in flexibility, adherence and other properties. The aforementioned resin can for example be an ethylene-polymeric unsaturated carboxylic acid copolymer, an ethylene-polymeric carboxylic acid copolymer ionomer or non-aqueous polyester resin, and at least one of these resins can be blended to improve a coating in flexibility and adherence.

When these resins are dissolved together with the present polyester resin being heated and resolved and dispersion in water is then provided by the aforementioned method, an aqueous coating material can be obtained to improve a coating in flexibility and adherence.

Furthermore the aqueous coating material of the present invention may have added thereto for example phosphoric acid, organic sulfonic acid, benzoyl peroxide or other similar organic peroxide, or a plasticizer, pigment, a surfactant, a lubricant, a thickener, a rheology regulator, vinyl acetate resin, polyolefin resin, polyamide resin or the like, as required, without impairing the dispersibility of the aqueous resin composition of the present invention in water.

Although the aqueous coating material of the present invention is not particularly limited in application, it is applicable for example to beverage and food cans or their lids, caps and the like preferably. Furthermore it can preferably be applied on internal and external surfaces of metal plates used for the above beverage and food cans or their lids, caps and the like.

Although the aforementioned metal plate is not particularly limited as long as it can be used as intended, it can for example be a tin plate, tin-free steel, aluminum and the like. These metal plates may have their surfaces previously chromated with chromic acid or phosphoric acid or undergoing serface-treating to enhance anti-corrosion and provide a coating with enhanced adherence.

Although the aqueous coating material of the present invention may be applied in known manners, it may be applied for example using a roll coater, a spray, a dip coater, a brush or the like to obtain a coated metal plate of the present invention.

Although the coating of the present invention is not particularly limited in thickness, generally it preferably has a thickness in a range of 3 to 20 μm, more preferably 3 to 10 μm, as measured when it is dry. If it has a thickness of no more than 3 μm, it would have a variety of barrier properties reduced, such as less resistant to water, acid, corrosion and the like. If it has a thickness of no less than 20 μm then it does not dry fast and thus tends to be disadvantageous in terms of cost.

Normally, the coating is preferably baked at a temperature of 100 to 300° C. for 5 seconds to 30 minutes, more preferably at 150 to 250° C. for 1 to 15 minutes.

Hereinafter the present invention in a second embodiment will be presented to further specifically describe the aqueous coating resin composition of the present invention and a metal plate coated therewith.

In the present invention, component (2A) or polyester resin has the following structural formula:

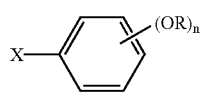

(1)

wherein R: H, alkyl or an aryl group,
X: an organic segment having at least one hydroxyl group or carboxyl group (including a carboxylic anhydride), and
n: 1 to 3

The polyester resin corresponding to component (2A) preferably contains no less than 0.5% by mole, more preferably no less than 1% by mole of structural formula (1). If structural formula (1) does not exist, settability with resol-type phenol resin particularly preferably used can be insufficient. Note that a phenolic OH group derived from structural formula (1) is not added as a resin acid value described later.

Typically, a possible crosslink reaction of polyester resin and resol-type phenol resin is condensation between a terminal OH group of the polyester resin and a methylol group and/or an alkoxy methyl group of the resol-type phenol resin. In addition, polyester resin (2A) having introduced structural formula (1) in a molecular chain thereof and/or at a terminal of the molecular chain is considered to experience a condensation (crosslink) reaction between structural formula (1) and component (2B) of resol-type phenol resin. This reaction is estimated to be similar to electrophilic substitution (condensation) introduced normally between resol-type phenol resins.

Structural formula (1) can be introduced in the polyester resin corresponding to component (2A) by a component such as diphenolic acid (4, 4-bis (4'-hydroxyphenyl)-pentanoic acid), p-hydroxybenzoic acid, m-hydroxybenzoic acid, o-hydroxybenzoic acid, p-hydroxyphenylacetic acid, m-hydroxyphenylacetic acid, o-hydroxyphenylacetic acid, p-hydroxyphenylpropionic acid, m-hydroxyphenylpropionic acid, o-hydroxyphenylpropionic acid, p-hydroxyphenethyl alcohol, m-hydroxyphenethyl alcohol, o-hydroxyphenethyl alcohol, 4-hydroxyphenylpyruvate, 4-hydroxymethylbenzoic acid, homovanillic acid, 4, 4'-oxydiphtalate dianhydride, 3-hydroxyisophthalic acid, bisphenol-A with alkylene oxide added thereto, bisphenol-F with alkylene oxide added thereto, and the like. Of these components, diphenolic acid, p-hydroxyphenylpropionic acid and p-hydroxyphenylacetic acid are preferably used.

These can be introduced into the polyester resin for example by polycondensation for that for example having a carboxyl group or a hydroxyl group (excluding a phenolic OH group), and by polycondensation or initial polycondensation and subsequent ring-opening and addition to a terminal of a molecular chain for that having an acid anhydride group, although the introduction of the above components into the polyester resin is not limited to the above methods.

The polyester resin corresponding to component (2A) can contain a carboxylic acid component such as: terephthalic acid, isophthalic acid, orthochromatic phthalic acid, naphthalene dicarboxylic acid and other similar aromatic dicarboxylic acids; succinic acid, glutaric acid, adipic acid, azelaic acid, sebacic acid, dodecanedione acid, dimer acid and other similar aliphatic dicarboxylic acids; maleic acid (anhydrous), fumaric acid, maleic acid added terpene and other similar unsaturated dicarboxylic acids; 1, 4-cyclohexane dicarboxylic acid, tetrahydrophthalic acid, hexahydroisophthalic acid, 1, 2-cyclohexenedicarboxylic acid and other similar alicyclic dicarboxylic acids; and trimellitic acid (anhydrous), pyromellitic acid (anhydrous), methylcyclohexenetricarboxylic acid and other similar carboxylic acids of a valence of three or more, and it can contain one or more selected from these components.

The polyester resin corresponding to component (2A) can contain a polyalcohol component such as ethylene glycol, propylene glycol (1, 2-propanediol), 1, 3-propanediol, 1, 4-butanediol, 1, 2-butanediol, 1, 3-butanediol, 2-methyl-1, 3-propanediol, neopentylglycol, 1, 5-pentanediol, 1, 6-hexanediol, 3-methyl-1, 5-pentanediol, 2-ethyl-2-butyl-1, 3-propanediol, 2, 4-diethyl-1, 5-pentanediol, 1-methyl-1, 8-octanediol, 3-methyl-1, 6-hexanediol, 4-methyl-1, 7-heptanediol, 4-methyl-1, 8-octanediol, 4-propyl-1, 8-octanediol, 1, 9-nonanediol and other similar aliphatic glycols; diethylene glycol, triethylene glycol, polyethylene glycol, polypropylene glycol, polytetramethylene glycol and other similar ether glycols; 1, 4-cyclohexanedimethanol, 1, 3-cyclohexanedimethanol, 1, 2-cyclohexanedimethanol, tricyclodecaneglycols, hydrogenated bisphenols and other similar alicyclic polyalcohols; trimethylolpropane, trimethylolethane, pentaerythritol and other similar polyalchols having a valence of three or more, and it can contain one or more selected from these components.

The polyester resin corresponding to component (2A) has a molecular chain with a carboxyl group therein and a resin acid value of 150 to 800 eq/$10^6$ g. Herein, having a molecular chain with a carboxyl group therein means that the carboxyl group exists at a terminal of a molecule of polyester and/or in a molecular chain of the polyester in the form of a pendant. The latter is preferable as such provides enhanced dispersiblity in water and allows a coating to have improved coating properties.

A resin acid value of less than 150 eq/$10^6$ g can contribute to unstable dispersion in water. Preferably it is no less than 180 eq/$10^6$ g. A resin acid value exceeding 800 eq/$10^6$ g can result in no retort resistance. Preferably, it is no more than 500 eq/$10^6$ g.

The carboxyl group can be introduced into the molecular chain of the polyester for example by opening a ring of a carboxylic anhydride and adding it to the polyester.

The carboxylic anhydride can for example be phthalic anhydride, maleic anhydride, succinic anhydride, trimellitic anhydride, itaconic anhydride, citraconic anhydride, and other similar monoanhydrides, hexahydrophthalic anhydride, and tetrahydrophthalic anhydride, pyromellitic anhydride, 1, 2, 3, 4-butanetetracarboxylic dianhydride, 1, 2, 3, 4-pentanetetracarboxylic dianhydride, 3, 3', 4, 4'-benzophenonetetracarboxylic dianhydride, cyclopentanetetracarboxylic dianhydride, 2, 3, 6, 7-naphthalenetetracarboxylic dianhydride, 1, 2, 5, 6-naphthalenetetracarboxylic dianhydride, ethyleneglycolbis trimellitate dianhydride, 2, 2', 3, 3'-diphenyltetracarboxylic dianhydride, thiophene-2, 3, 4, 5-tetracarboxylic dianhydride, ethylenetetracarboxylic dianhydride, and 4, 4'-oxydiphthalic dianhydride and 5-(2, 5-dioxotetrahydrofurfuryl)-3-cyclohexene-1, 2-dicarboxylic anhydride, and it can be one or more selected from the above.

The carboxylic anhydride can be added to obtain the polyester resin corresponding to component (2A), for example as follows: (1) immediately after the polyester resin that has not yet had the carboxylic anhydride added thereto has attained a targeted molecular weight Mn equal to 5,000 to 100,000), the carboxylic anhydride that is melt (150 to 280° C.) may be added by a required amount; (2) when the polyester resin has less than a targeted molecular weight (Mn smaller than 5,000), the carboxylic anhydride may be added to increase the current molecular weight to the target in an ambient of nitrogen; or (3) the polyester resin that has not yet had acid added thereto and the carboxylic anhydride may be mixed and kneaded by a melt and extrusion apparatus to add acid. Any of these methods can provide the polyester resin used in the present invention.

The polyester resin corresponding to component (2A) used in the present invention preferably has a number-average molecular weight of 5,000 to 100,000, more preferably no less than 8,000, still more preferably no less than 10,000, and more preferably no more than 50,000, still more preferably no more than 30,000. For a number-average molecular weight of less than 5,000, a coating can be brittle and thus poor in flexibility and retort resistance. For a number-average molecular weight exceeding 100,000, applicability can be reduced. Glass transition temperature (Tg) is preferably 0 to 120° C., more preferably to 10 to 100° C., still more preferably 30 to 100° C. A glass transition temperature of less than 0C contributes to poor retort resistance. Tg of no less than 50° C. is desirable, in particular, for keeping flavors of contents. Tg exceeding 120° C. can contribute to reduced flexibility and poor applicability. Note that the number-average molecular weight referred to herein is measured by a gel permeation chromatography (GPC) through a calculation curve of standard polystyrene.

Glass transition temperature (Tg) is measured by a differential scanning calorimeter (DSC).

The aqueous coating material composition of the present invention is formed of the polyester resin corresponding to component (2A) and the phenol resin corresponding to component (2B). Component (2B) is preferably resol-type phenol resin.

The resol-type phenol resin corresponding to component (2B) can for example be o-cresol, p-cresol, p-tert-butylphenol, p-ethylphenol, 2, 3-xylenol, 2, 5-xylenol or other similar difunctional phenol compounds, phenol, m-cresol, m-ethylphenol, 3, 5-xylenol, m-methoxy phenol, bisphenol-A, bisphenol-F or other similar phenol compounds having no less than three reactive sites with formaldehyde. These phenol compounds are made by formalin, paraformaldehyde, trioxane or the like into methylol desirably having no less than one methylol group per aromatic ring nucleus. After the phenol compound is rendered into a methylol, the methylol group is rendered into alkoxy methyl desirably with no less than one alkoxy methyl group on average per aromatic nucleus. In particular, to further enhance settability, a phenol component containing no less than 50% by weight of a phenol compound having no less than three reactive sites with formaldehyde is desirably used as a source material. The alkoxy-methylation can be achieved by alcohols such as monovalent alcohol having one to eight, preferably one to four carbon atoms. Suitable monovalent alcohol can be methanol, ethanol, n-propanol, n-butanol, isobutanol and the like, more preferably n-butanol. Furthermore, the alkoxy-methylation can be achieved by using a catalyst such as phospholic acid.

The aqueous coating resin composition of the present invention preferably contains the polyester resin corresponding to component (2A) and the phenol resin corresponding to component (2B) within a range provided by the following expression:

component (2A)/component (2B)=99/1 to 50/50 (% by weight).

If the phenol resin corresponding to component (2B) is smaller than the range of the expression, flexibility and retort resistance can be impaired. If it is greater than the range of the expression then a coating would significantly lose flexibility and can thus have reduced coating properties.

In addition to the phenol resin corresponding to component (2B) of the present invention, a crosslinker can be used, as required. It can be amino resin, an isocyanate compound, epoxy resin or the like. Hygienically, amino resin is particularly preferable. These crosslinkers can be blended and used to such a degree that they do not impair a coating's properties.

The aforementioned amino resin can include amino resin having a methylol group that is obtained by a reaction between melamine, urea, benzoguanamine, acetoguanamine, steroguanamine, spiloguanamine, dicyandiamide or any other similar amino component, and formaldehyde, paraformaldehyde, acetaldehyde, benzaldehyde or any other similar aldehyde component. The amino resin also includes that having the methylol group that is etherified with alcohol having one to six carbon atoms. These amino resins can be used individually or together. Hygienically, amino resins using melamine and benzoguanamine are preferable, and that using benzoguanamine is more preferable as it is excellent in retort resistance and extractability.

The amino resin using benzoguanamine is preferably benzoguanamine resin methyl-etherified or having a methylol group partially or entirely etherified with methyl alcohol, benzoguanamine resin butyl-etherified or having a methylol group etherified with butyl alcohol, or benzoguanamine resin etherified by a mixture of methyl ether and butyl ether provided by etherification using methyl alcohol and butyl alcohol, respectively. The butyl alcohol is preferably isobutyl alcohol or n-butyl alcohol.

The amino resin using melamine is preferably melamine resin methyl-etherified or having a methylol group partially or entirely etherified with methyl alcohol, melamine resin butyl-etherified or having a methylol group partially or entirely etherified with butyl alcohol, or melamine resin etherified by a mixture of methyl ether and butyl ether provided by etherification using methyl alcohol and butyl alcohol, respectively.

The can coating material composition of the present invention may contain 0.01 to 3% by weight of acid catalyst (2C) as a setting catalyst for the entire resin (the polyester resin corresponding to component (2A) and the phenol resin corresponding to component (2B) that are added together). With the composition containing acid catalyst (2C), a crosslinking reaction can be facilitated and a steadily crosslink can be obtained by baking the medium at 180 to 300 degrees centigrade in 15 seconds to 10 minutes. For short-time baking, the medium is preferably baked at 270 degrees centigrade for 20 to 60 seconds. For low-temperature baking, it is preferably baked at 200 degrees centigrade for 3 to 10 minutes. For less than 0.01% by weight of acid catalyst (2C), setting tends to be less facilitated. For more than 3% by weight of the acid catalyst, the coating would be reduced in water resistance and retort resistance. The acid catalyst can for example be sulfuric acid, p-toluenesulfonic acid, dodecylbenzenesulfonic acid, naphthalene sulfonic acid, dinonylnaphthalenesulfonic acid, dinonylnaphthalenedisulfonic acid, camphor sulfonic acid, phosphoric acid and these acids with an amine block (i.e., having amine added thereto to partially neutralize the acid), and it can be one or more thereof used together. Dodecylbenzenesulfonic acid and neutralization thereof are preferable in terms of compatibility with resin and hygiene.

The can coating material resin composition of the present invention can contain a lubricant. Preferably, 0.1 to 10 parts by weight of the lubricant is added to 100 parts by weight of the entire resin corresponding to component (2A). This can effectively prevent a coating from having a scar in producing a can and help the coating to be smoother in shaping it. It is particularly effective in DI processing and DRD processing. The lubricant used can for example be a polyol compound and a fatty acid that are esterified or fatty acid ester wax, silicon-based wax, fluorine-based wax, polyethylene or any other similar polyolefine wax, lanolin-based wax, montan wax, microcrystalline wax, carnouba wax, and a silicon-based compound. One or more of these lubricants mixed together can be used.

For applications, the aqueous coating material resin composition of the present invention can be blended with titanium oxide, silica or any other similar known inorganic pigment, phosphoric acid and an esterification thereof, an organic tin compound or any other similar setting catalyst, surfactant, defoamer, dispersant, lubricant or other similar known additives.

The aqueous resin composition of the present invention is preferably the polyester resin corresponding to component (2A) and the resol-type phenol resin corresponding to component (2B) that are dispersed in water or water/an organic solvent in the presence of a basic compound. The basic compound is preferably a compound vaporizable by baking provided when a coating is formed. Ammonium and/or an organic amine compound having a boiling point of no more than 250 degrees centigrade are used. Preferably the basic compound can for example be triethylamine, N, N-diethylethanolamine, N, N-dimethylethanolamine, aminoethanolamine, N-methyl-N, N-diethanolamine, isopropylamine, iminobispropylamine, ethylamine, diethylamine, 3-ethoxypropylamine, 3-diethylaminopropylamine, sec-butylamine, propylamine, methylaminopropylamine, dimethylaminopropylamine, methyliminobispropylamine, 3-methoxypropylamine, monoethanolamine, diethanolamine, triethanolamine, morpholine, N-methylmorpholine and N-ethylmorpholine. These basic compounds are required to have an amount capable of at least partial neutralization for the acid value of the polyester resin corresponding to component (2A). More specifically, the basic compound equivalent weight of 0.5 to 1.5 is desirably added for the acid value of the polyester resin. The basic compound equivalent weight of less than 0.5 can result in the composition of the present invention dispersing in water less effectively. The basic compound equivalent weight exceeding 1.5 can result in significantly increased viscosity of the polyester resin dispersed in water and hydrolysis of the polyester.

The aqueous coating material resin composition of the present invention is dispersed in water or water/an organic solvent. To maintain film formability, and the coating's dryability, re-solubility and stable dispersibility, the organic solvent is preferably used. The organic solvent is preferably that providing the polyester corresponding to component (2A) with plasticity effectively and also amphipatic, such as ethanol, n-propanol, isopropanol, n-butanol, isobutanol, sec-butanol, tert-butanol, isoamyl alcohol, sec-amyl alcohol, tert-amyl alcohol, n-hexanol, cyclohexanol and other similar alcohols, methylethylketone, methylisobutylketone, ethylbutylketone, and other similar ketones, tetrahydrofuran, dioxane, 1, 3-dioxolane and other similar cyclic ethers, ethyleneglycol, ethyleneglycolmonomethylether, ethyleneglycolmonoethylether, ethyleneglycolmonobutylether, ethyleneglycolmonoethylether acetate, diethyleneglycol, diethyleneglycolmonomethylether, diethyleneglycolmonoethylether, diethyleneglycolmonobutylether, diethyleneglycolethylether acetate, propylene glycol, propyleneglycolmonomethylether, propyleneglycolmonobutylether, propyleneglycolmethylether acetate and other similar glycol derivatives, 3-methoxy-3-methyl butanol, 3-methoxybutanol, acetonitrile, dimethylformamide, dimethylacetamide, dimethylacetamide, diacetone alcohol, ethyl acetoacetate, and the like.

The aqueous coating material resin composition of the present invention can be obtained for example as follows: One or more of the aforementioned solvents is/are selected and the polyester resin corresponding to component (2A) is heated and thus dissolved. Then the resol-type phenol resin corresponding to component (2B) and a basic compound are agitated and added by a required amount and water is then added. The water to be added may be heated to have a temperature close to that of varnish having the polyester resin dissolved therein. The addition of the water allows phase transition to provide a dispersoid in water. Furthermore, as required, the solvent used to dissolve the polyester resin corresponding to component (2A) can be heated or its surrounding ambient can be vacuumed and the solvent can thus be removed through vaporization. Desirably, the ambient is vacuumed at no more than 100° C., more preferably no more than 80° C., and the solvent is thus removed through vaporization to allow the resol-type phenol resin corresponding to component (2B) to reduce condensation attributed to the heat introduced during the removal of the solvent through vaporization. If the organic solvent is entirely removed a completely aqueous resin composition can be obtained. To allow a dispersion to be stable and to provide film formability, however, the organic solvent of 3 to 20% is desirably contained.

Furthermore the polyester resin corresponding to component (2A) can be crushed into pieces and the resol-type phenol resin corresponding to component (2B), a basic compound and the aforementioned solvent can be introduced by a required amount and heated and thus dispersed to obtain the aqueous coating material resin composition of the present invention. Desirably, they are heated at no more than 100° C.

Preferably, the former method of dispersion can provide a stable aqueous dispersion.

The can coating material resin composition of the present invention can use other resin to improve a coating in flexibility, adherence and other properties. The other resin can for example be an ethylene-polymeric unsaturated carboxylic acid copolymer, an ethylene-polymeric carboxylic acid copolymer ionomer or non-aqueous polyester resin, and at least one of these resins can be blended to effectively improve a coating in flexibility and adherence. When these resins are dissolved together with the polyester resin corresponding to component (2A) being heated and resolved and dispersion in water is then provided by the aforementioned method, an aqueous dispersion can be obtained.

The present can coating material composition can be applied on internal and external surfaces of any metal plate that can be used for beverage and food cans and their lids, caps and the like. It can for example be a tin plate, tin-free steel, aluminum and the like. These metal plates may have their surfaces previously chromated with chromic acid or phosphoric acid or undergoing surface-treating to enhance anti-corrosion and provide a coating with enhanced adherence.

The coating material composition of the present invention can be applied in known manners such as using a roll coater, a spray, or the like to provide a coated metal plate of the present invention. Although the coating is not particularly limited in thickness, it preferably has a thickness of 3 to 18 µm, more preferably 3 to 10 µm, as measured when it is dry. Normally, the coating is preferably baked at a temperature of approximately 100 to 300° C. for approximately 5 seconds to 30 minutes, more preferably at a temperature of approximately 150 to 270° C. for approximately 30 seconds to 15 minutes.

Hereinafter examples of the first embodiment of the present invention will be presented to specifically describe the present invention, although the present invention is not limited thereto. In the following description, the term "part(s)" will refer to "part(s) by weight."

Example of Synthesis of Polymer Resin (1a)

230 parts of terephthalic acid, 540 parts of isophthalic acid, 440 parts of 2-methyl-1, 3-propanediol, 300 parts of 1, 4-cyclohexanedimethanol, and 0.5 part of titaniumtetrabutoxide (or dibutyl tin oxide) were introduced into a 3L, 4-mouth flask. They were increased in temperature gradually over 4 hours to 235° C. and thus esterified. After a prescribed amount of water has been output through vaporization the pressure was reduced over 30 minutes to 10 mmHg to provide initial polymerization and the temperature was also increased to 255° C. and in that condition under no more than 1 mmHg for 80 minutes subsequent polymerization was provided. Once a targeted molecular weight has been attained the medium was cooled in an ambient of nitrogen to 220° C. 20 parts of ethyleneglycolbistrimellitate dianhydride and 18 parts of trimellitic anhydride were then successively introduced and they were continuously agitated in an ambient of nitrogen at 200 to 230° C. for one hour. Polyester resin (1a) was thus obtained for use in an example of the present invention.

Example of Synthesis of Polyester Resins (1b)–(1e)

As well as the example of synthesis (1a), polyester resins (1b)–(1e) for use in an example of the present invention were similarly synthesized, except that they each had a composition, as shown in Table 1, in molar ratio.

Polyester resins (1b)–(1e) each had a composition and a molar fraction, a number-average molecular weight, a reduced viscosity, a glass transition temperature and an acid value, as measured as well as polyester resin (1a), as shown in Table 1:

TABLE 1 compositions and values of characteristics of polyester resins exemplarily synthesized

| | | polyester resin | 1a | 1b | 1c | 1d | 1e |
|---|---|---|---|---|---|---|---|
| composition (molar ratio) | poly-carboxylic acid component | terephthalic acid | 30 | 50 | 45 | 99.5 | 73 |
| | | isophthalic acid | 70 | 49 | 44.5 | — | 25 |
| | | sebacic acid | — | — | 10 | — | — |
| | | trimellitic acid | — | 1 | 0.5 | 0.5 | 2 |
| | poly-alcohol component | ethylene glycol | — | — | 50 | 15 | — |
| | | diethylene glycol | — | — | — | — | 50 |
| | | propylene glycol | — | — | — | 65 | — |
| | | 2-methyl-1,3-propanediol | 65 | 45 | — | — | 50 |
| | | 1,4-butanediol | — | 55 | — | — | — |
| | | neopentylglycol | — | — | 50 | — | — |
| | | 1,4-cyclohexane-dimethanol | 35 | — | — | 20 | — |
| | compound with carboxylic anhydride group | trimellitic anhydride (post-added) | 2 | 1 | 2 | 3 | 1.5 |
| | | ethyleneglycol bistrimellitate dianhydride (*1) | 1 | 2 | 2 | 2 | 1 |
| | | carboxylic polyanhydride content [mole %] | 33.3 | 66.7 | 50.0 | 40.0 | 40.0 |

TABLE 1-continued compositions and values of characteristics of polyester resins exemplarily synthesized

|  |  | 1a | 1b | 1c | 1d | 1e |
|---|---|---|---|---|---|---|
| values of characteristics | number-average molecular weight | 15,000 | 9,000 | 12,000 | 8,000 | 20,000 |
|  | reduced viscosity (dl/g) | 0.45 | 0.35 | 0.40 | 0.30 | 0.70 |
|  | Tg (° C.) | 55 | 35 | 40 | 87 | 38 |
|  | resin acid value (eq/$10^6$ g) | 270 | 310 | 390 | 510 | 220 |

*1: produced by New Japan Chemical Co., Ltd.

Examples of Synthesis of Polyester Resins (1f)–(1i)

As well as the example of synthesis (1a), polyester resins (1f)–(1i) for use in a comparative example of the present invention were similarly synthesized, except that they each had a composition, as shown in Table 2, in molar ratio.

Polyester resins (1f)–(1i) each had a composition and a molar fraction, a number-average molecular weight, a reduced viscosity, a glass transition temperature and an acid value, as measured as well as polyester resin (1a), as shown in Table 2:

solid content of approximately 50% (1j). Table 3 shows its composition and molar ratio used when it was synthesized.

Furthermore, resol-type phenol resin crosslinker (1j) has an average number of alkoxy methyl groups per aromatic nucleus, a number-average molecular weight and a gel time, as measured as described hereinafter. The measurements are shown in Table 3.

Example of Synthesis of Resol-Type Phenol Resins (1k)–(1n)

TABLE 2 compositions and values of characteristics of polyester resins exemplarily synthesized

|  |  | polyester resin | 1f | 1g | 1h | 1i |
|---|---|---|---|---|---|---|
| composition (molar ratio) | poly-carboxylic acid component | terephthalic acid | 30 | 50 | 45 | 73 |
|  |  | isophthalic acid | 70 | 49 | 44.5 | 25 |
|  |  | sebacic acid | — | — | 10 | — |
|  |  | trimellitic acid | — | 1 | 0.5 | 2 |
|  | poly-alcohol component | ethylene glycol | — | — | 50 | — |
|  |  | diethylene glycol | — | — | — | 50 |
|  |  | 2-methyl-1,3-propanediol | 65 | 45 | — | 50 |
|  |  | 1,4-butanediol | — | 55 | — | — |
|  |  | neopentylglycol | — | — | 50 | — |
|  |  | 1,4-cyclohexane dimethanol | 35 | — | — | — |
|  | compound with carboxylic anhydride group | trimellitic acid (post-added) | 2 | 4 | 11 | 1.5 |
|  |  | ethyleneglycol bistrimellitate dianhydride (*1) | 1 | — | 3 | 0.1 |
|  |  | carboxylic polyanhydride content [mole %] | 33.3 | 0 | 21.4 | 6.3 |
| values of characteristics |  | number-average molecular weight | 3,000 | 12,000 | 12,000 | 20,000 |
|  |  | reduced viscosity (dl/g) | 0.20 | 0.40 | 0.40 | 0.68 |
|  |  | Tg (° C.) | 48 | 35 | 47 | 37 |
|  |  | resin acid value (eq/$10^6$ g) | 280 | 330 | 1200 | 140 |

*1: produced by New Japan Chemical Co., Ltd.

Example of Synthesis of Resol-Type Phenol Resin (1j)

Resol-type phenol resin for use in an example of the present invention was synthesized, as described below: 100 parts of m-cresol, 180 parts of an aqueous 37% formalin solution, and one part of sodium hydroxide were added and allowed to react at 60° C. for 3 hours and thereafter dehydrated under a reduced pressure at 50° C. for one hour. Then 100 parts of n-butanol was added and allowed to react at 110 to 120° C. for 4 hours. After the reaction completed, the obtained solution was filtered to obtain a resol-type phenol resin crosslinker based on m-cresol and having a As well as resol-type phenol resin (1j), resol-type phenol resins (1k)–(1n) for use in an example or a comparative example of the present invention were similarly synthesized, except that the latter were synthesized using compositions having ratios in weight, as shown in Table 3.

Resol-type phenol resins (1k)–(1n) each had an average number of alkoxy methyl groups existing per aromatic nucleus, a number-average molecular weight and a gel time, as measured as well as the example of synthesis (1j). The measurements are shown in Table 3.

TABLE 3 compositions and values of characteristics of resol-type phenol resin exemplarily synthesized

| | resol type phenol resin | | 1j | 1k | 1l | 1m | 1n |
|---|---|---|---|---|---|---|---|
| composition of synthesis (% by weight) | phenol component (starting source material) | type | m-cresol | m-cresol/ p-cresol | 3,5-xylenol | m-cresol | phenol |
| | | quantity | 100 | 70/30 | 100 | 100 | 100 |
| | | content of phenol compound with 3 functional groups or more (% by weight) | 100 | 70 | 100 | 100 | 100 |
| values of characteristics | type of alcohol used for alkoxymethylation | | n-butanol | n-butanol | n-butanol | ethanol | n-butanol |
| | mean value of no. of alkoxy methyl groups per aromatic ring nucleus (*1) | | 1.9 | 1.7 | 1.5 | 1.2 | 0.8 |
| | number-average molecular weight | | 750 | 800 | 650 | 900 | 1000 |
| | gel time (sec) | | 350 | 150 | 260 | 25 | 25 |

EXAMPLE 1

100 parts of polyester resin (a), 80 parts of methylethylketone and 20 parts of n-butyl-cellosolve® were introduced into a 1L, 4-mouth flask and dissolved at 75° C. Then, 2.5 parts of N, N-dimethylethanolamine, 35 parts of resol-type phenol resin (j) and 40 parts of isopropanol were successively introduced and uniformed at 70° C. 200 parts of water was then introduced to effect phase transition.

After 70° C. was attained, a vacuum distillation apparatus (a T branch tube, a capacitor, a solution trap, a vacuum pump or the like) was attached to the flask to vacuum it to remove a solvent through vaporization. After the methylethylketone and isopropanol introduced were completely removed through vaporization the medium was cooled to obtain an aqueous dispersoid having a solid content of 36%. To 30 parts of this aqueous dispersoid, 0.6 part of catalyst 602 (with an adapted solid content of 5%) was added as a catalyst to provide an aqueous resin composition (1) of an example of the present invention.

Furthermore, aqueous resin composition (1) was applied on metal plates (of aluminum: #5052, 70 mm×150 mm×0.5 mm, and of tin: 5 mm×100 mm×0.22 mm) with a bar coater to have a thickness of 4 to 8 μm, and baked at 230° C. (a temperature of the ambient) for 80 seconds and thus set. The plates thus processed were used as a testing piece of aluminum (1) and a testing piece of tin (1).

EXAMPLES 2–8

Aqueous resin compositions (2)–(8) of examples of the present invention and testing pieces of aluminum (2)–(8) and those of tin (2)–(8) of examples of the present invention were obtained, similarly as described in example 1, except that the compositions of the resins and the catalysts are as shown in Table 4, represented in ratio by weight.

TABLE 4 composition and property estimation of aqueous resin composition (amount blended represented in part(s) by weight)

| examples | | | 1 | 2 | 3 | 4 | 5 | 6 | 7 | 8 |
|---|---|---|---|---|---|---|---|---|---|---|
| aqueous resin composition nos. | | | 1 | 2 | 3 | 4 | 5 | 6 | 7 | 8 |
| composition & % by weight of solid | polyester resin | ex. of synthesis | 1a | 1a | 1b | 1c | 1d | 1e | 1a | 1b |
| | | amount blended | 100 | 100 | 100 | 100 | 100 | 100 | 100 | 100 |
| | phenol resin | ex. of synthesis | 1j | 1j | 1k | 1l | 1l | 1j | 1j | 1m |
| | | amount blended | 15 | 15 | 15 | 30 | 10 | 25 | 150 | 15 |
| | basic compound | type | N,N-dimethyl-aminoethanol | tri-ethyl amine | N,N-dimethylaminoethanol | | | | | |
| | | amount blended | 2.5 | 3.0 | 3.0 | 3.8 | 5.0 | 2.2 | 2.5 | 3.0 |
| | amino resin | Mycoat 106*1 | — | 5 | — | — | — | — | — | — |

TABLE 4-continued composition and property estimation of aqueous resin composition
(amount blended represented in part(s) by weight)

| examples | | 1 | 2 | 3 | 4 | 5 | 6 | 7 | 8 |
|---|---|---|---|---|---|---|---|---|---|
| aqueous resin composition nos. | | 1 | 2 | 3 | 4 | 5 | 6 | 7 | 8 |
| | catalyst catalyst 602*2 | 0.3 | 0.2 | 0.25 | 0.2 | 0.2 | 0.1 | 0.2 | 0.25 |
| charac- | settability | ○ | ○ | ○ | ○ | ○ | ○ | ○ | Δ |
| teristics | flexibility 1 (mA) | 0 | 0.1 | 0.2 | 0.8 | 0.7 | 0.2 | 30.0 | 2.4 |
| of coating | flexibility 2 (mA) | 0.1 | 0.2 | 0.5 | 0.8 | 0.9 | 0.3 | 55.0 | 3.8 |
| | retort resistance | ⊙ | ⊙ | ○ | ⊙ | ○ | ○ | ⊙ | Δ |
| | acid resistance in flexibility (mA) | 0.1 | 0.2 | 0.5 | 0.9 | 0.9 | 0.4 | 67.0 | 4.4 |
| | extractability (ppm) | 2.0 | 3.9 | 2.3 | 3.2 | 3.5 | 3.1 | 5.9 | 3.9 |
| sprayability | | ○ | ○ | ○ | ○ | ○ | ○ | Δ | ○ |

*1: methyl-etherified benzoguanamine resin (produced by Mitsui Cytec, Ltd.)
*2: Amine-neutralized dodecylbenzenesulfonic acid (produced by Mitsui Cytec, Ltd.)

COMPARATIVE EXAMPLES 9–14

Aqueous resin compositions (9)–(14) of comparative examples of the present invention and testing pieces of aluminum (9)–(14) and those of tin (9)–(14) of comparative examples of the present invention were obtained, similarly as described in example 1, except that the compositions of the resins and the catalysts are as shown in Table 5, represented in ratio by weight. Note that comparative example 14 corresponds a reproduction provided when polyester resin used in the present invention that is set by amino resin.

Estimation of Performance

Testing pieces of aluminum (1)–(14) and those of tin (1)–(14) were used to estimate properties of the obtained coatings including settability, flexibility 1, flexibility 2, retort resistance, acid resistance in flexibility, and extractability, as shown in Tables 4 and 5. Simultaneously, aqueous resin compositions (1)–(14) were also estimated in sprayability, as shown in Tables 4 and 5. The properties were estimated, as will be described hereinafter.

As is apparent from Tables 4 and 5, a metal plate with the aqueous resin composition of the present invention applied thereto is superior in settability, flexibility 1 and flexibility 2, retort resistance, acid resistance in flexibility, and extractability, and the aqueous resin composition of the present invention is superior in sprayability.

Furthermore the aqueous resin composition of the present invention does not contain bisphenol-A and is also superior

TABLE 5 composition and property estimation of aqueous resin composition
(amount blended represented in part(s) by weight)

| comparative ex. | | | 9 | 10 | 11 | 12 | 13 | 14 |
|---|---|---|---|---|---|---|---|---|
| aqueous resin composition nos. | | | 9 | 10 | 11 | 12 | 13 | 14 |
| composi- | polyester | ex. of synthesis | 1a | 1f | 1g | 1h | 1i | 1c |
| tion & % | resin | amount blended | 100 | 100 | 100 | 100 | 100 | 100 |
| by weight of solid | phenol resin | ex. of synthesis | — | 1j | 1j | 1j | 1n | — |
| | | amount blended | — | 20 | 10 | 20 | 20 | — |
| | basic com- pound | type | | | N,N-dimethylaminoethanol | | | |
| | | amount blended | 2.5 | 2.7 | 3.2 | 11.7 | 1.4 | 3.9 |
| | amino resin | Mycoat 106*1 | — | — | — | — | — | 30 |
| | catalyst | catalyst 602*2 | — | 5 | 0.2 | 0.1 | 0.3 | 0.2 |
| charac- | settability | | X | ○ | Δ | ○ | ○ | Δ |
| teristics | flexibility 1 (mA) | | 16.2 | 5.9 | 1.5 | 4.7 | 3.3 | 0.2 |
| of coating | flexibility 2 (mA) | | 28.6 | 8.7 | 2.2 | 12.0 | 4.2 | 0.3 |
| | retort resistance | | X | Δ | Δ | X | ○ | X |
| | acid resistance in flexibility (mA) | | 50.8 | 11.0 | 2.5 | 48.0 | 4.7 | 5.9 |
| | extractability (ppm) | | 18.0 | 3.1 | 4.8 | 13 | 3.2 | 4.5 |
| sprayability | | | ○ | ○ | ○ | ○ | X | Δ |

*1: methyl-etherified benzoguanamine resin (produced by Mitsui Cytec, Ltd.)
*2: amine-neutralized dodecylbenzenesulfonic acid (produced by Mitsui Cytec, Ltd.)

in extractability It can thus be said to be hygienic for human body as well as environmentally.

Hereinafter an example related to the second embodiment of the present invention will be referred to to specifically describe the present invention. In the example, the term "part(s)" refers to "part(s) by weight." Note that each measurement item followed the method described hereinafter.

Synthesis of Polyester Resin of the Present Invention

Example of synthesis (2a) by Method of Ester Interchange 120 parts of dimethyl terephthalic acid, 280 parts of dimethylisophthalate, 4 parts of trimellitic acid, 260 parts of 2-methyl-1, 3-propanediol, 180 parts of 1, 4-cyclohexanedimethanol and 0.2 part of titaniumtetrabutoxide (or dibutyl tin oxide) were introduced into a 2L flask and heated for 4 hours gradually to 220° C. and methanol was allowed to flow out to effect interesterification. After a prescribed amount of methanol flew out, 12 parts of diphenolic acid was added and agitated at 220° C. for 30 minutes. Then the pressure was reduced over 30 minutes to 10 mmHg to provide initial polymerization and the temperature was also increased to 255° C. and in that condition with no more than 1 mmHg for 90 minutes subsequent polymerization was provided. Once a targeted molecular weight has been attained the medium was cooled in an ambient of nitrogen to 220° C. Then 10 parts of ethyleneglycolbistrimellitate dianhydride and 10 parts of trimellitic anhydride were successively introduced and continuously agitated in an ambient of nitrogen at 200 to 230° C. for one hour. Polyester resin (2a) of the present invention was thus obtained.

Example of Synthesis (2 a) by Method of Esterification 105 parts of terephthalic acid, 240 parts of isophthalic acid, 190 parts of 2-methyl-1, 3-propanediol, 235 parts of 1, 4-cyclohexanedimethanol, and 0.2 part of titaniumtetrabutoxide (or dibutyl tin oxide) were introduced into a 2L 4-mouth flask and heated gradually over 4 hours to 235OC and allowed to have water to flow out for esterification. After a prescribed amount of water has flown out, 12 parts of diphenolic acid was added and agitated at 220° C. for 30 minutes. 30 minutes were taken to reduce the pressure to 10 mmHg to provide initial polymerization and the temperature was also increased to 255° C. and in that condition under no more than 1 mmHg for 100 minutes subsequent polymerization was provided. Once a targeted molecular weight has been attained the medium was cooled in an ambient of nitrogen to 220° C. Then 10 parts of ethyleneglycolbistrimellitate dianhydride and 10 parts of trimellitic anhydride were successively introduced and continuously agitated in an ambient of nitrogen at 200 to 230° C. for one hour. Polyester resin (2a) of the present invention was thus obtained.

Resin (2a) obtained through ester interchange and that obtained through esterification do not have a difference in property. Their compositions and values of characteristics are shown in Table 1.

Examples of Synthesis (2b)–(2e)

Example of synthesis (2a) through esterification or ester interchange provided polyester resins (2b)–(2e) of the present invention each having a composition, as shown in Table 6.

TABLE 6

| ex. of synthesis | | | 2a | 2b | 2c | 2d | 2e |
|---|---|---|---|---|---|---|---|
| composition & molar ratio | Polycarboxylic acid component | terephthalic acid | 30 | 50 | 45 | 98 | 50 |
| | | isophthalic acid | 69 | 49 | 44.5 | — | 50 |
| | | sebacic acid | — | — | 10 | — | — |
| | | trimellitic acid | 1 | 1 | 0.5 | 2 | — |
| | poly-alcohol component | ethylene glycol | — | — | 50 | 15 | 45 |
| | | propylene glycol | — | — | — | 65 | — |
| | | 2-methyl-1,3 propanediol | 65 | 45 | — | — | — |
| | | 1,4-butanediol | — | 55 | — | — | — |
| | | neopentylglycol | — | — | 50 | — | — |
| | | CHDM*1 | 35 | — | — | 20 | — |
| | compound with component represented by formula (1) | diphenolic acid | 2 | — | — | 5 | — |
| | | p-hydroxyphenyl-acetic acid | — | 3 | — | — | — |
| | | ODPA*2 | — | — | 2 | — | — |
| | | BPA-EO*3 | — | — | — | — | 55 |
| | for modification of carboxylic acid | trimellitic acid | 2 | 1 | 2 | 3 | 2 |
| | | TMEG*4 | 1 | 2 | — | — | 3 |
| values of characteristics | | number-average molecular weight | 15,000 | 10,000 | 12,000 | 8,000 | 20,000 |
| | | reduced viscosity (dl/g) | 0.45 | 0.38 | 0.40 | 0.30 | 0.70 |
| | | Tg (° C.) | 55 | 35 | 40 | 87 | 68 |
| | | resin acid value (eq/$10^6$ g) | 270 | 315 | 370 | 510 | 320 |

*1: 1,4-cyclohexanedimethanol
*2: 4,4'-oxydiphthalic acid dianhydride
*3: bisphenol-A with 2 mole of ethylene oxide added thereto, introduced as polyalcohol.
*4: ethyleneglycolbistrimellitate dianhydride (produced by New Japan Chemical Co., Ltd.)

Examples of Synthesis (2f)–(2i)

Similar to the example of synthesis (2a), there were obtained polyester resins (2f)–(2i) for comparative examples each having a composition as shown in Table 7.

TABLE 7

| ex. of synthesis | | | 2f | 2g | 2h | 2i |
|---|---|---|---|---|---|---|
| composition + molar ratio | Poly-carboxylic acid component | terephthalic acid | 30 | 50 | 45 | 98 |
| | | isophthalic acid | 69 | 49 | 44.5 | — |
| | | sebacic acid | — | — | 10 | — |
| | | trimellitic acid | 1 | 1 | 0.5 | 2 |
| | poly-alcohol component | ethylene glycol | — | — | 50 | 15 |
| | | propylene glycol | — | — | — | 65 |
| | | 2-methyl-1,3-propanediol | 65 | 45 | — | — |
| | | 1,4-butanediol | — | 55 | — | — |
| | | neopentylglycol | — | — | 50 | — |
| | | CHDM*1 | 35 | — | — | 20 |
| | for modification of carboxylic acid | trimellitic acid | 0.5 | 9 | 4 | 3 |
| | | TMEG*2 | 1 | 2 | — | — |
| | *3 | diphenolic acid | — | — | — | 2 |
| values of characteristics | | number-average molecular weight | 15,000 | 10,000 | 12,000 | 3,000 |
| | | reduced viscosity (dl/g) | 0.45 | 0.38 | 0.40 | 0.20 |
| | | Tg (° C.) | 55 | 35 | 40 | 60 |
| | | resin acid value (eq/$10^6$ g) | 130 | 950 | 370 | 270 |

*1: 1,4-cyclohexanedimethanol
*2: ethyleneglycolbistrimellitate dianhydride (produced by New Japan Chemical Co., Ltd.)
*3: compound with component represented by formula (1)

Synthesis of Resol-Type Phenol Resin of Example of Synthesis (2j)

100 parts of m-cresol, 180 parts of an aqueous 37% formalin solution, and one part of sodium hydroxide were added and allowed to react at 60° C. for 3 hours and thereafter dehydrated under a reduced pressure at 50° C. for one hour. Then 100 parts of n-butanol was added and allowed to react at 110 to 120° C. for 4 hours. After the reaction completed, the obtained solution was filtered to obtain a resol-type phenol resin crosslinker based on m-cresol and having a solid content of approximately 50% (2j). Its composition in synthesis is shown in Table 8.

Other Resol-Type Phenol Resins

As well as the example of synthesis (2j), other resol-type phenol resins (2k)–(2n) were similarly obtained. Their compositions in synthesis are shown in Table 8.

TABLE 8

| resol-type phenol resin | | 2j | 2k | 2l | 2m | 2n |
|---|---|---|---|---|---|---|
| phenol component (starting material) | type | m-CS | m-CS/p-CS | Xyl | p-CS | Ph |
| | quantity | 100 | 70/30 | 100 | 100 | 100 |
| number-average molecular weight | | 750 | 800 | 2000 | 900 | 1000 |
| type of alkoxy methyl group | | n-Bu | n-Bu | n-Bu | Et | n-Bu |
| amount of alkoxy methyl group | | 1.9 | 1.7 | 1.1 | 1.2 | 0.8 |

Note that in Table 8, m-CS represents m-cresol, p-CS represents p-cresol, Xyl represents 3, 5-xylenol, and Ph represents phenol.

EXAMPLE 21

100 parts of polyester resin (2a), 80 parts of methylethylketone and 20 parts of n-butyl-cellosolve were introduced into a 1L, 4-mouth flask and dissolved at 75° C. Then, 2.5 parts of N, N-dimethylethanolamine, 35 parts of resol-type phenol resin 0) and 40 parts of isopropanol were successively introduced and uniformed at 70° C. 200 parts of water was then introduced to effect phase transition.

After 70° C. was attained, a vacuum distillation apparatus (a T branch tube, a capacitor, a solution trap, a vacuum pump or the like) was attached to the flask to vacuum it to remove a solvent through vaporization. After the methylethylketone and isopropanol introduced were completely removed through vaporization the medium was cooled to obtain an aqueous dispersoid having a solid content of 36%. To 30 parts of this dispersoid, 0.6 part of catalyst 602 (with an adapted solid content of 5%) was added to provide an aqueous coating material resin composition (21) of the present invention. The composition was then applied and baked in the above-described method to obtain a testing piece of a coated metal plate of the present invention.

EXAMPLES 22–27

As well as example 21, coating resin compositions (22)–(27) of the present invention were similarly obtained and then applied and baked in the above-described method to provide testing pieces of coated metal plates of the present invention. Their compositions, and their evaluations using the pieces are shown in Table 9.

Note that the testing pieces were prepared, as follows:

A coating material composition was applied on metal plates (an aluminum piece: #5052, 70 mm×150 mm×0.5 mm, and a tin piece: 5 mm×100 mm×0.22 mm) by a bar coater to have a thickness of 4 to 8 μm. The coated pieces were then baked to set the coating material to provide sample pieces. they were baked at 270° C. (a temperature to be attained) for 30 seconds (to indicate that a short temporal period of baking also allows sufficient settability).

TABLE 9

| examples | | | 21 | 22 | 23 | 24 | 25 | 26 | 27 |
|---|---|---|---|---|---|---|---|---|---|
| composition & % by weight of solid | polyester resin | ex. of synthesis | 2a | 2a | 2b | 2c | 2d | 2e | 2a |
| | | amount blended | 100 | 100 | 100 | 100 | 100 | 100 | 100 |
| | phenol resin | ex. of synthesis | 2j | 2k | 2l | 2m | 2n | 2j | 2j |
| | | amount blended | 15 | 15 | 15 | 30 | 20 | 10 | 150 |
| | amino resin | Mycoat 106*1 | — | 5 | — | — | — | — | — |
| | catalyst | catalyst 602*2 | 0.3 | 0.2 | 0.25 | 0.2 | 0.2 | 0.1 | 0.2 |
| characteristics of coating | settability | | ⊙ | ○ | ⊙ | ○ | ⊙ | ⊙ | ⊙ |
| | flexibility 1 (mA) | | 0 | 0.2 | 0.2 | 0.6 | 0.6 | 0.2 | 31 |
| | flexibility 2 (mA) | | 0 | 0.2 | 0.4 | 0.7 | 0.8 | 0.3 | 61 |
| | retort resistance | | ⊙ | ⊙ | ○ | ⊙ | ○ | ○ | ⊙ |
| | acid resistance in flexibility (mA) | | 0 | 0.1 | 0.4 | 0.6 | 0.7 | 0.5 | 72 |
| | extractability (ppm) | | 2.2 | 3.3 | 2.2 | 3.2 | 3.4 | 3.0 | 6.0 |

*1: methyl-etherified benzoguanamine resin (produced by Mitsui Cytec, Ltd.)
*2: amine-neutralized dodecylbenzenesulfonic acid (produced by Mitsui Cytec, Ltd.)

COMPARATIVE EXAMPLES 28–32

As well as example 21, coating resin compositions (28)–(32) for comparative examples were similarly obtained and also applied and baked in the above-described method to obtain testing pieces of the comparative examples. Their compositions and their evaluations using the pieces are shown in Table 10.

Note that comparative example (28) is used for a reproduction provided when polyester resin corresponding to component (2a) of the present invention is set by amino resin.

TABLE 10

| comparative examples | | | 28 | 29 | 30 | 31 | 32 |
|---|---|---|---|---|---|---|---|
| composition & % by weight of solid | polyester resin | ex. of synthesis | 2a | 2f | 2g | 2h | 2i |
| | | amount blended | 100 | 100 | 100 | 100 | 100 |
| | phenol resin | ex. of synthesis | — | 2j | 2m | 2l | 2n |
| | | amount blended | — | 15 | 20 | 30 | 25 |
| | amino resin | Mycoat 106*1 | 20 | — | — | — | — |
| | catalyst | catalyst 602*2 | 0.3 | 0.25 | 0.3 | 0.2 | 0.2 |
| characteristics of coating | settability | | X | X | ○ | ○ | Δ |
| | flexibility 1 (mA) | | 1.1 | 6.9 | 6.5 | 3.5 | 10 |
| | flexibility 2 (mA) | | 1.5 | 9.9 | 7.9 | 4.2 | 13 |
| | retort resistance | | Δ | ○ | X | Δ | X |
| | acid resistance in flexibility (mA) | | 2.1 | 11.8 | 9.5 | 4.5 | 45 |
| | extractability (ppm) | | 3.1 | 6.2 | 4.0 | 4.9 | 12 |

*1: methyl-etherified benzoguanamine resin (produced by Mitsui Cytec, Ltd.)
*2: amine-neutralized dodecylbenzenesulfonic acid (produced by Mitsui Cytec, Ltd.)

As is apparent from Tables 9 and 10, a metal plate with the aqueous can coating resin composition applied thereon is superior in settability, flexibility (1) and (2), retort resistance, acid resistance in flexibility, and extractability.

Note that the above variety of analyses, measurements and property evaluations were provided, as described below:

Method of Analysis of Polyester Resin

Polyester resin was measured for each item, as follows:

(i) Determination of Composition of Polyester Resin in Molar Ratio

A 500 MHz nuclear magnetic resonance spectrum apparatus was used to determine polyester resin's acid component, alcohol component in molar ratio, and phenol resin's methylol group and alkoxy methyl group.

(ii) Measurement of Number-average Molecular Weight of Polyester Resin

Gel permeation chromatography (GPC) was employed to measure polyester resin's number-average molecular weight through a calibration curve of standard polystyrene. It used tetrahydrofuran as a solvent.

(iii) Measurement of Reduced Viscosity of Polyester Resin 0.10 g of polyester resin was dissolved in 25 cc of a solvent provided by a mixture of phenol/tetrachloroethane (a ratio of 6/4 by weight) and it was measured at 30° C. using a uberoude-type viscometer.

(iv) Measurement of Glass Transition Temperature (Tg) of Polyester Resin

A differential scanning calorimeter was used to measure polyester resin's Tg at a temperature rising at a rate of 20° C./min. 5mg of resin is placed in an aluminum pan, lidded and crimped hard.

(v) Acid Value of Polyester Resin 0.2 g of polyester was dissolved in 20ml of chloroform and titrated with a 0.1N KOH ethanol solution to obtain an equivalent of 10 g of resin to measure polyester resin's acid value.

Method of Analysis of Resol-Type Phenol Resin (i) Average Number of Alkoxy Methyl Groups Existing per Aromatic Nucleus of Resol-Type Phenol Resin A 500 MHz nuclear magnetic resonance spectrum apparatus was used for the measurement. It was calculated from a value determined of methylol group and that of alkoxy methyl group of phenol resin.

(ii) Number-Average Molecular Weight of Resol-Type Phenol Resin

A gel permeation chromatography (GPC) was employed to measure resol-type phenol resin's number-average molecular weight through a calibration curve of standard polystyrene.

(iii) Gel Time of Resol-Type Phenol Resin

An obtained resol-type phenol resin solution was dropped on a metal plate heated to 150° C., and the time elapsing before it is no longer soluble in methylethylketone was measured.

Property Evaluation

Testing pieces of aluminum (1)–(14), (21)–(32) and those of tin (1)–(14), (21)–(32) were used to estimate properties of the obtained coatings including settability, flexibility 1, flexibility 2, retort resistance, acid resistance in flexibility, and extractability, as shown in Tables 4 and 5, and 9 and 10. Simultaneously, aqueous resin compositions (1)–(14), were also estimated in sprayability, as shown in Tables 4 and 5. The properties were estimated, as follows.

(i) Settability

A piece of felt with methylethyl ketone absorbed therein was applied on a coated surface of a testing piece of aluminum and it was reciprocated while a load of 0.5kg was applied thereto. From the reciprocation count obtained when the piece of felt reached a base material of the aluminum piece, settability was determined, as follows:

⊚: excellent (greater than 20 times)
○: good (equal to or greater than 10 times)
Δ: more or less insufficiently set (5 to 10 times)
×: not set (less than 5 times)

(ii) Flexibility 1

One testing piece of aluminum was inserted and folded back in the direction of 180°, and bent by a vice. The bent portion was brought into contact with a sponge immersed in an aqueous 1% NaCl solution and had a voltage of 5.5V applied thereto to measure its conductance for estimation. Smaller conductance (equal to or smaller than 1.5 mA) is better.

(iii) Flexibility 2

A testing piece of tin was loosely folded back in the direction of 180° and therebetween another testing piece of tin was further inserted and the bent portion was bent by a weight of 1 kg (in the form of a block) dropped from a height of 40 cm. The obtained bent portion was brought into a sponge immersed in an aqueous 1% NaCl solution and had a voltage of 5.5V applied thereto to measure its conductance for estimation. Smaller conductance (equal to or smaller than 1.5 mA) is better.

(iv) Retort Resistance

A testing piece of aluminum was erected and placed in a stainless steel cup. Ion exchanged water was poured to reach half the height of the sample piece. The cup was then placed in an autoclave and retorted at 125° C. for 30 minutes. Then the degree of whitening in the water and that of whitening in the vapor were visually determined, as follows:

⊚: good
○: although slight whitened, no blister observed
Δ: slightly whitened, or slight blister observed
×: significantly whitened or significant blister observed (v) Acid Resistance in Flexibility A testing piece of aluminum was immersed in an aqueous solution containing 1% by weight of citric acid and it was treated at 125° C. for 30 minutes. The same method as applied for flexibility 1 was then employed to measure the piece's conductance for estimation. Smaller conductance (equal to or smaller than 1.5 mA) is better.

(vi) Extractability

A liquid extracted after a retort resistance test was titrated with potassium permanganate to quantify an amount of an organic substance extracted from a coating for estimation. Smaller numerical values are better.

(vii) Sprayability

Aqueous resin compositions (1)–(14) were diluted with water to provide a solid content of 20% and then applied through a spray to visually observe how the nozzle was clogged and estimate it in accordance with the following criterion:

○: good
Δ: more or less clogged
×: significantly clogged

As has been described above, the aqueous resin composition of the present invention can be free of an endocrine disrupter such as bisphenol-A and superior in settability, flexibility, retort resistance, hygienicity, sprayability and dispersibility in water.

Thus the aqueous resin composition of the present invention can be used as a vehicle for example of coating material, ink, coating agents, adhesives, or an agent used to processing textile, film and paper products and the like suitably.

Furthermore the aqueous coating material of the present invention that is applied on beverage and food cans or their lids and caps and a metal plate used in their production can endure processing of the cans being produced, vapor generated in a retort process, heat, salt and acid in contents, and thus exhibit an excellent property. Furthermore it can be free of a bisphenol compound regarded as an extrinsic-factor endocrine disruptor. It is thus not toxic to human body nor does it provide a pollutant when it is dumped or recycled. It can thus be a coating material friendly to human body as well as environmentally.

Furthermore the aqueous coating material of the present invention that is applied on an internal surface of a food can or that of a beverages can does not have toxicity for its nature and when it is dumped or recycled it does not provide pollutant effluents, and it can also endure processing of the cans being produced, vapor generated in a retort process, heat, salt and acid in contents. Furthermore, the aqueous coating material of the present invention can be substituted for epoxy-phenolic coating material or other similar coating material containing a bisphenol compound regarded as an extrinsic-factor endocrine disruptor raised as an issue in recent years. Thus the aqueous resin composition of the present invention, formed of an aqueous polyester resin having in a molecule a structure superior in flexibility and settability with phenol resin and resol-type phenol resin, can accommodate any setting conditions, be superior in retort resistance and extractability, and does not contain or output the afore-mentioned toxic compound. It is thus particularly suitable as a material for coating an internal surface of a can.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An aqueous resin composition containing components:
   (A) polyester resin obtained through a reaction by opening a ring of a compound having a carboxylic anhydride group and thus adding said opened ring of said compound to polyester, said compound containing at least a carboxylic polyanhydride, said polyester resin having a resin acid value of 150 to 800 eq/$10^6$g and a number-average molecular weight of 5,000 to 100,000;
   (B) phenol resin;
   (C) a basic compound; and
   (D) water, or water and an organic solvents,
   wherein one hundred percent by mole of said compound having said carboxylic anhydride group is formed of no less than ten percent by mole of a carboxylic polyanhydride and one hundred minus said no less than ten percent by mole of a carboxylic monoanhydride.

2. The aqueous resin composition of claim 1, wherein said carboxylic polyanhydride is an ethyleneglycolbistrimellitate dianhydride.

3. The aqueous resin composition of claim 1, wherein said phenol resin is resol resin.

4. The aqueous resin composition of claim 3, wherein said phenol resin is a copolymer of a formaldehyde and phenol compound containing no less than 50% by weight of a phenol compound having no less than three reactive sites with the formaldehyde.

5. The aqueous resin composition of claim 4, wherein said phenol resin has at least one alkoxy methyl group on average per aromatic nucleus.

6. The aqueous resin composition of claim 1, containing 1 to 99 parts by weight of said phenol resin for 99 parts by weight of said polyester resin.

7. The aqueous resin composition of claim 1, containing said basic compound equivalent weight of 0.5 to 1.5 for said resin acid value of said polyester resin.

8. An aqueous resin composition containing components:
   (A) polyester resin obtained through a reaction by opening a ring of a compound having a carboxylic anhydride group and thus adding said opened ring of said compound to polyester, said compound containing at least a carboxylic polyanhydride, said polyester resin having a resin acid value of 150 to 800 eq/$10^6$g and a number-average molecular weight of 5,000 to 100,000;
   (B) phenol resin;
   (C) a basic compound; and
   (D) water, or water and an organic solvent,
   the aqueous resin composition containing 0.01 to 3 parts by weight of an acid catalyst for 100 parts by weight of said polyester resin and said phenol resin as added together.

9. An aqueous coating material containing the aqueous resin composition as recited in any of claims 1 and 2–8.

10. A coating provided by the aqueous coating material as recited in claim 9.

11. A metal plate coated with the aqueous coating material as recited in claim 9.

* * * * *

UNITED STATES PATENT AND TRADEMARK OFFICE
CERTIFICATE OF CORRECTION

PATENT NO. : 7,030,197 B2
APPLICATION NO. : 10/188223
DATED : April 18, 2006
INVENTOR(S) : Morimoto et al.

It is certified that error appears in the above-identified patent and that said Letters Patent is hereby corrected as shown below:

<u>In the title page,</u> item

(75) Inventors:  delete "Katsuya Shimeno, Ohtsu (JP);"

Title Page, item

(30) Foreign Application Priority Data:

delete "Sep. 4, 2001    (JP) ................. 2001-267695"

Signed and Sealed this

Twenty-first Day of November, 2006

JON W. DUDAS
*Director of the United States Patent and Trademark Office*